UNITED STATES PATENT OFFICE.

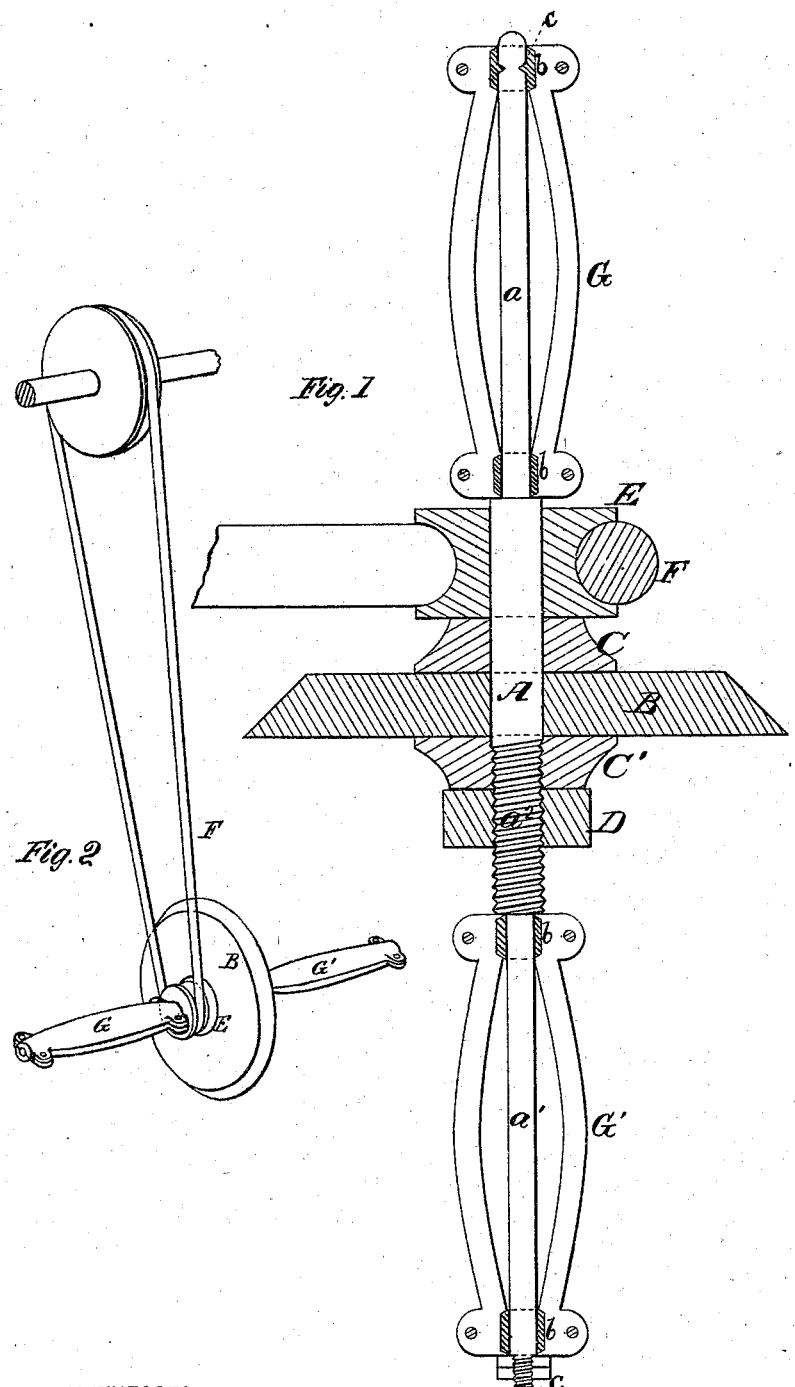

GEORGE MITCHELL, OF HOLLAND CITY, MICHIGAN.

IMPROVEMENT IN SAW-GUMMERS.

Specification forming part of Letters Patent No. 147,420, dated February 10, 1874; application filed January 10, 1874.

*To all whom it may concern:*

Be it known that I, GEORGE MITCHELL, of Holland City, in the county of Ottawa and State of Michigan, have invented a new and valuable Improvement in Saw-Gummers; and I do hereby declare that the following is a full, clear, and exact description of the construction and operation of the same, reference being had to the annexed drawings making a part of this specification, and to the letters and figures of reference marked thereon.

Figure 1 of the drawings is a representation of a sectional view of my saw-gummer. Fig. 2 is a perspective view of the same.

This invention has relation to portable saw-gummers; and it consists in an emery-wheel, or a circular file, which is removably but rigidly secured on a spindle, which rotates in two hollow handles applied on opposite sides of the said wheel, on which spindle is also secured a pulley adapted to receive a round and elastic driving-belt, as will be more fully explained hereinafter.

In the annexed drawings, A represents the spindle of the improved tool, on which is applied a circular gumming-wheel, B, which may be made in whole or part of a substance known as "emery." C C' represent two collars, one of which is permanently fixed on the spindle A, but the other is removable. D is a nut applied on the screw-threaded portion $a^2$ of the spindle A, for the purpose of rigidly confining the wheel B between the two collars C C'. E is a pulley fixed on the spindle A, and constructed with an annular groove in its periphery, adapted for receiving a round belt, F, which is made of india-rubber, for the purpose of affording the required elasticity. The reduced portions $a$ $a^1$ of the spindle are applied in handles G G', which are hollow, and in the ends of which are fitted annular bearings $b$ $b$, of babbitt-metal or other suitable bearing metal. Each handle is made of two longitudinal halves, connected by means of screws through ears formed on these halves. I am thus enabled to remove the bearing-rings $b$ when they are too much worn, and substitute new rings. The handle G is held on the spindle by means of a feather, $c$, fitting into an annular groove, and the handle G' is held on the spindle by means of nuts $c$, by removing which and unscrewing the nut D the wheel B can be taken off the spindle.

The tool thus described is intended to be used in the hands of the operator, and to be driven by means of the elastic belt F, which should pass around a driving-pulley arranged in a convenient position over the head of the operator, who will thus be able to manipulate the tool as he may desire.

By the employment of a driving-belt which is circular in cross-section, and a pulley, F, having a groove in it which is semicircular in cross-section, the tool can be tilted at any desired angle, without twisting the belt or running it off the pulley.

What I claim as new, and desire to secure by Letters Patent, is—

1. The wheel B, confined on the spindle A by means of collars C C' and a nut, D, in combination with the pulley E and the handles G G', constructed substantially as and for the purposes described.

2. The combination of the round elastic driving-belt F and the pulley E with the portable saw-gummer herein described.

In testimony that I claim the above I have hereunto subscribed my name in the presence of two witnesses.

GEORGE MITCHELL.

Witnesses:
   JNO. O. POST,
   H. D. POST.